Jan. 10, 1939.  F. C. REYNOLDS  2,143,452
AUTOMATIC TRANSMISSION
Filed Oct. 2, 1934  6 Sheets-Sheet 1

Fig. 1.

Inventor
FRANK C. REYNOLDS
By C. L. Parker Jr.
Attorney

Jan. 10, 1939. F. C. REYNOLDS 2,143,452
AUTOMATIC TRANSMISSION
Filed Oct. 2, 1934 6 Sheets-Sheet 2

Inventor
FRANK C. REYNOLDS

Jan. 10, 1939.  F. C. REYNOLDS  2,143,452
AUTOMATIC TRANSMISSION
Filed Oct. 2, 1934  6 Sheets-Sheet 4

Inventor
FRANK C. REYNOLDS

Jan. 10, 1939.  F. C. REYNOLDS  2,143,452
AUTOMATIC TRANSMISSION
Filed Oct. 2, 1934  6 Sheets-Sheet 5

Inventor
FRANK C. REYNOLDS
By C. R. Parker Jr.
Attorney

Patented Jan. 10, 1939

2,143,452

UNITED STATES PATENT OFFICE 2,143,452

AUTOMATIC TRANSMISSION

Frank C. Reynolds, Columbus, Ohio

Application October 2, 1934, Serial No. 746,580

34 Claims. (Cl. 74—259)

This invention relates to automatic power transmissions, particularly for motor vehicles, and is an improvement over the structure described and claimed in my prior Patent No. 1,972,107, issued September 4, 1934.

In my prior patent referred to I have discussed the disadvantages of the present type conventional sliding gear transmissions which have been developed probably to their greatest efficiency but still leave much to be desired because of the inherent limitations of a transmission of such type. In a conventional transmission, for example, the shifting of gears under various conditions depends wholly upon the judgment of individual drivers. Because of the demands of the average driver for rapid acceleration and high vehicle top speed, manufacturers are forced to provide motor vehicles with engines developing power far beyond the normal or average requirements. This fact results in substantial power losses as will be apparent.

Moreover, conventional transmissions require the disengagement of the clutch and the shifting of the gears with a consequent interruption of driving torque for an appreciable period at each gear shifting operation. This interrupted driving torque is highly disadvantageous, particularly when the vehicle is ascending a grade. Conventional transmissions are further disadvantageous because of the presence of serious destructive forces such as shock and vibration, particularly when the handling of the various transmission elements is not accomplished with proper skill.

My prior patent referred to discloses an automatic transmission wherein the numerous disadvantages of the conventional transmission are eliminated, it being necessary ordinarily merely to engage the clutch when starting the vehicle. Changes in the transmission ratio are accomplished by torque variations, and accordingly when the vehicle is started from a standstill the substantial torque reaction operates automatically to provide the proper driving ratio. This ratio is reduced automatically when the torque decreases to a predetermined point. Since torque reaction is depended upon, it will be apparent that my prior construction operates to delay the reduction in the transmission ratio if the operator depresses the accelerator to open the throttle in such a manner as to provide rapid acceleration from a standstill to a relatively high speed. The change occurs earlier if the driver operates the throttle relatively more slowly, since the decrease in the driving torque necessary to effect the change in the driving ratio occurs earlier under such conditions.

My prior construction effects the changing in the transmission ratios automatically and without any interruption in the delivery of driving torque and possesses a substantial degree of inherent flexibility to absorb torsional vibration and shock, thus minimizing the destructive effect of such forces. Moreover, such prior construction affords rapid changes in the driving ratio and operates automatically to provide the proper driving ratio, thus permitting the vehicle motor to operate at more efficient speeds in accordance with varying torque conditions whereby smaller engines may be used with substantial economy and efficient operation. Moreover, quicker acceleration and deceleration is provided to simplify car control, and more efficient gear operation is provided due to the inherent characteristics of the construction.

Various other desirable characteristics are inherent in my prior construction, but additional functions and characteristics are desirable to more nearly meet the demands for an ideal vehicle transmission. Extensive studying and experimentation has developed the fact that an automatic automobile transmission should not depend alone on engine torque for changes in transmission ratios, nor should it depend upon driver demand or engine or vehicle speeds. Conventional transmissions meet the requirement as to driver demand more or less satisfactorily, and several types of transmissions have been developed in which transmission ratios are varied or changed in accordance with engine or vehicle speeds.

In connection with the latter type of transmission, practical use has developed the fact that a speed controlled transmission leaves much to be desired. For example, there is little uniformity in the habits and practices of individual drivers in the handling of their vehicles. Where one driver will start a vehicle from a standstill and accelerate it slowly, another driver, demanding extreme "performance", will open the throttle of the engine relatively wide for a rapid start, and will continue rapid vehicle acceleration to a relatively high speed. An automatic transmission which operates wholly in accordance with engine or vehicle speed takes no account of different driver characteristics and will effect a reduction in the driving ratio at a predetermined engine or vehicle speed. Such a change in the driving ratio is wholly satisfactory for the driver who accelerates his vehicle relatively slowly, but is wholly unsatisfactory for the type of driver who demands fast acceleration from a standstill to relatively high vehicle speeds, the transmission referred to operating under all conditions to shift the driving ratio at a fixed predetermined point with respect to engine or vehicle speeds.

The same operation occurs upon the deceleration of the vehicle, regardless of whether the vehicle is to be brought to a standstill or merely is intended to travel at a relatively low speed as is frequently necessary in city traffic. When the vehicle speed has been decelerated to the predetermined point referred to, the transmission automatically increases the driving ratio when it is wholly unnecessary and undesirable. Moreover, in transmissions of this type, it has been found to be extremely difficult to effect the engagement and disengagement of the clutches employed in the transmission without excessive slipping and wearing of the clutch plates. This condition is particularly aggravated when the vehicle is driven at the approximate speed at which transmission ratio changes take place, since "hunting" occurs with the frequent substantially constant engagement and disengagement of the clutch which results in excessive wear and the heating and burning of the transmission lubricant.

From the foregoing it will be apparent that so far as automatic vehicle transmissions have been developed up to the present time, the prior art is represented by the conventional transmission which is intended to meet driver demand more or less satisfactorily; the speed controlled type which is responsive solely to changes in speed; and the torque controlled type as represented by my prior patent referred to. So far as I am aware, no transmission has been developed which meets the requirements as to driver demand, torque and speed, either separately or in combination.

An important object of the present invention, generally stated, is to provide an automatic vehicle transmission which is controlled by two forces, namely, speed and torque, operating together or separately for effecting changes in the transmission ratio, and capable of being variably governed in accordance with driver demand.

A further object is to provide an automatic vehicle transmission which operates automatically upon the operation of the vehicle to effect a decrease in the driving ratio at variable vehicle speeds in accordance with the torque reaction, as determined by driving conditions and the manner in which the vehicle is accelerated by the driver, in combination with speed controlled means.

A further object is to provide a transmission of the character referred to wherein the increase in the vehicle speed to a predetermined point will automatically change the gear ratio independently of torque reactions, if the vehicle is accelerated so slowly as to maintain the torque reaction below a predetermined point.

A further object is to provide an apparatus of the character referred to wherein the driver, after the vehicle has been accelerated to a predetermined point, may effect a decrease in the driving ratio at will merely by releasing and then depressing the accelerator to close and open the throttle.

A further object is to provide a transmission which operates automatically to increase the driving ratio if the torque load on the engine is increased and the engine speed is decreased, as when ascending a hill, and which operates to reduce the driving ratio automatically as soon as there is a predetermined decrease in torque reaction or a predetermined increase in vehicle speed, or both.

A further object is to provide a transmission of the character referred to wherein the parts are perfectly balanced to permit the transmission to act as a flywheel and thus provide smoothness in operation with the damping out of torsional and other vibrations.

A further object is to provide a transmission in which all driving conditions are taken care of without the use of a countershaft, and wherein the drive in high gear takes place in a direct line through the transmission.

A further object is to provide an automatic transmission which normally involves a higher and a lower ratio with infinite variations therebetween, in combination with a still lower gear for use in extreme conditions and capable of use at any speed without disengaging the main clutch.

A further object is to provide an automatic transmission involving the use of a friction clutch and embodying such inherent features of operation as to reduce clutch slippage and the consequent wearing of the clutch and the heating of the lubricant to a minimum.

A further object is to provide an automatic transmission having many advantages over the conventional transmissions and prior automatic transmissions, and wherein the apparatus is simple, durable and compact.

Other objects and advantages of the invention will become apparent during the course of the following description.

In the drawings, I have shown several embodiments of the invention. In this showing.

Figure 1:
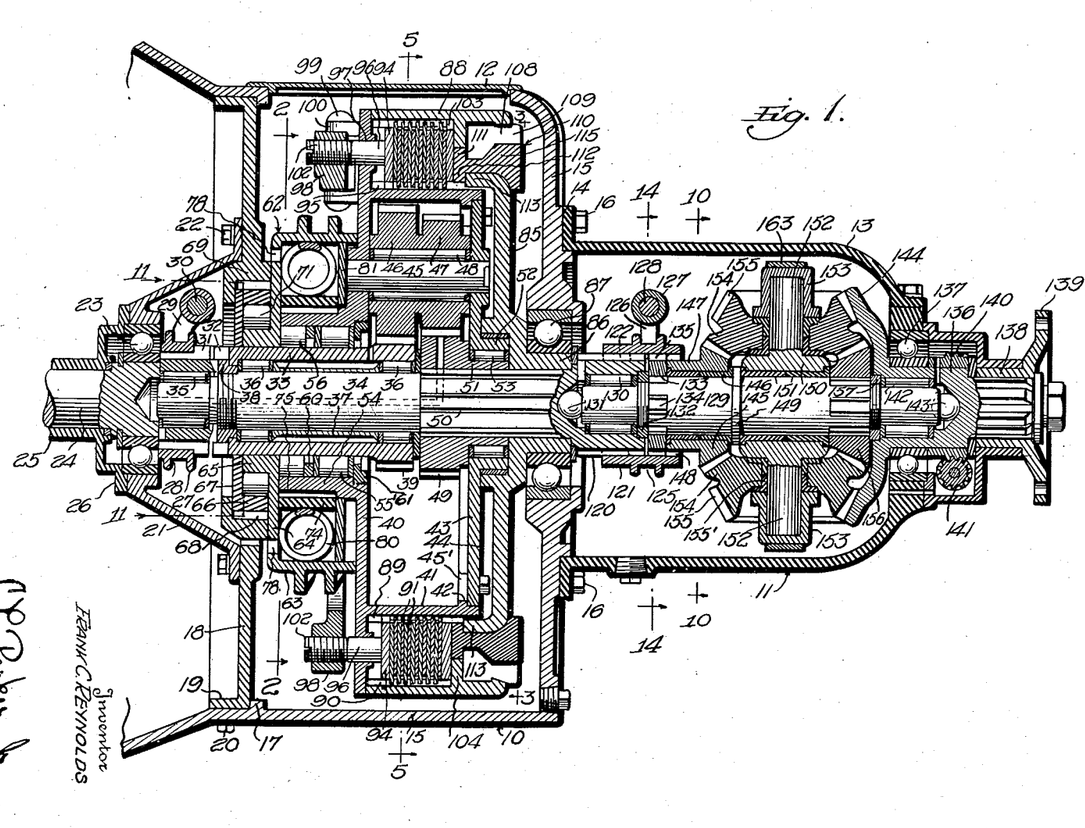
Figure 1 is a central vertical longitudinal sectional view.

Referring to Figure 1 the numerals 10 and 11 designate forward and rear transmission housings respectively provided with cover plates 12 and 13. The rear housing 11 is provided with a forward radial flange 14 bolted or otherwise secured to the rear wall 15 of the housing 10, as at 16. As will become apparent, the housing 10 contains the elements of the automatic change speed transmission per se, while the housing 11 contains the low and reverse gear elements and associated parts.

The forward portion of the housing 10 is provided with an internal flange 17 against which seats the forward wall or plate 18 for the housing 10, the plate 18 having a cylindrical flange 19 secured within the housing 10 as at 20. A forwardly extending conical housing 21 is secured to the plate 18 as at 22 and an anti-friction bearing 23 of any suitable type is arranged within the forward end of the housing 21. This bearing receives a drive shaft 24, extending rearwardly from the main or conventional vehicle clutch (not shown). A sleeve 25 is provided with a rear flange 26 seating against the outer race of the bearing 23 and secured to the forward end of the housing 21. The sleeve 25 extends forwardly to support the thrust bearing for the main clutch.

Within the housing 11, the shaft 24 has splined connection with a shift collar 27, grooved as at 28 to receive the forks of a shift member 29. This member is mounted upon a rock shaft 30 controlled from any suitable point adjacent the driver's seat. Sleeve 27 is provided with rearwardly projecting fingers 31 engageable with similar fingers 32 formed at the forward end of a driving sleeve 33 arranged coaxial with the shaft 24 and surrounding a driven shaft 34. The forward end of the shaft 34 extends into the rear end of the shaft 24 and is journalled in a pilot bearing 35 arranged therein.

The sleeve 33 is journalled on roller bearings 36, surrounding the shaft 34 and spaced apart by means of a suitable spacer 37. The forward bearing 36 is maintained in position by a ring 38 threaded on the shaft 34, and the ring 38 acts as a thrust bearing for the sleeve 33. It will be apparent that the fingers 31 and 32 constitute a positive clutch for connecting the shaft 24 to the sleeve 33 to drive the latter, and a driving pinion 39 is formed on the rear end of the sleeve 33, preferably integral therewith.

A plate 40 surrounds the sleeve 33 and is arranged radially with respect thereto. Spaced from its outer edge, the plate 40 is provided with a rearwardly extending cylindrical flange 41. The flange 41 is provided with an internal flange 42 against which is seated a plate 43 arranged parallel to the plate 40. The plate 43 is secured with respect to the plate 40 by screws 44 threaded in ears 45' projecting inwardly from the flange 42 (see Figure 4).

A plurality of shafts 45 are circumferentially spaced around the axis of the shaft 34 and the ends of each shaft 45 project through openings formed in the respective plates 40 and 43. Each shaft 45 supports a pair of integral planetary gears 46 and 47, journalled on roller bearings 48 surrounding the shaft 45. The pinion 39 forms the driving means for the planetary gears and meshes with each of the gears 46. Each of the gears 47 meshes with a driven gear 49 splined as at 50 on the driven shaft 34 and provided with a rearwardly extending hub 51. The plate 43 is provided with a rearwardly extending flange 52 journalled on roller bearings 53 surrounding the hub 51.

Figures 2, 3, 4:
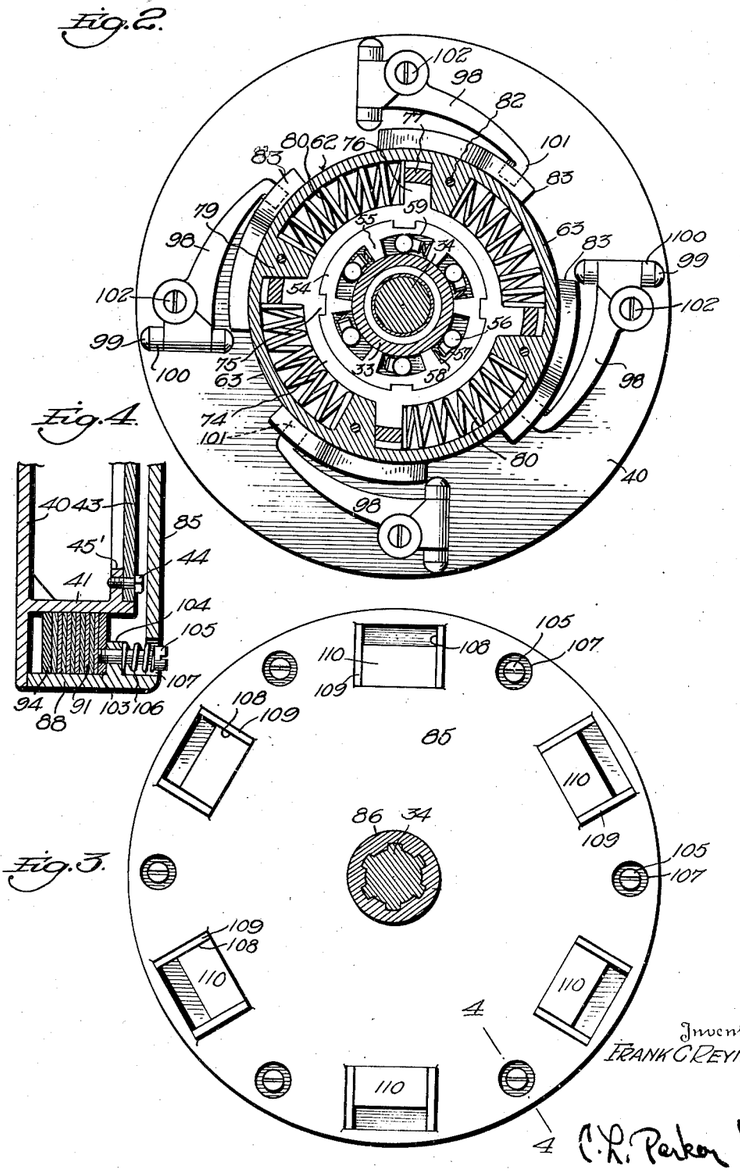
Figure 2 is a transverse vertical sectional view on line 2—2 of Figure 1.
Figure 3 is a similar view on line 3—3 of Figure 1.
Figure 4 is a fragmentary detailed sectional view through a portion of the friction clutch unit.

The plate 40 is provided with a forwardly extending cylindrical flange 54 surrounding the sleeve 33 and journalled with respect thereto by roller bearings 55'. An overrunning clutch prevents clockwise rotation of the flange 54 with respect to the sleeve 33, and such clutch is illustrated in Figure 2. The collar 54 is provided with inwardly extended fingers 55 defining a plurality of arcuate spaces in which are arranged clutch rollers 56. A shoe 57 engages each roller 56, and a spring 58 is arranged between each shoe 57 and the adjacent finger or lug 55. The rollers 56 constantly engage the outer surface of the sleeve 33 and the inner surface of the collar 54, and the latter surface is formed as a series of eccentric bases 59, as shown in Figure 2. It will be apparent that the sleeves 33 and 54 are rotatable as a unit, but overrunning of the sleeve 54 in a clockwise direction with respect to the sleeve 33 locks these two sleeves together, thus providing the overrunning clutch referred to.

The overrunning clutch, of course, permits the sleeve 54 to run at any slower speed than the sleeve 33, in a clockwise direction, and accordingly the sleeve 54 is adapted to remain stationary during clockwise rotation of the sleeve 33. The overrunning clutch is separated from the bearings 55' by a spacer 60, and the bearings 55' are retained in position by a treated washer 61.

Figure 11:
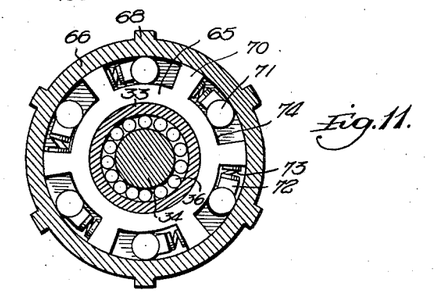
Figure 11 is a similar view taken substantially on line 11—11 of Figure 1.

A spring controlled drum indicated as a whole by the numeral 62 is arranged forwardly of the plate 40 and includes a cylindrical flange 63 surrounding and spaced from the sleeve 54. The drum 62 further includes a radial flange 64 having an inner hub portion 65 surrounding the sleeve 33. An overrunning clutch is provided for preventing counterclockwise rotation of the drum 62. Such overrunning clutch is illustrated in Figures 1 and 11. As shown, a sleeve 66, having a forward wall 67, is splined as at 68 within a cylindrical flange 69 formed integral with the forward plate 18. The sleeve 65 (see Figure 11) is provided with outstanding lugs 70 rotatable within the sleeve 66, and the spaces between the lugs 70 receive rollers 71 engaged by shoes 72, urged in one direction by springs 73 engaging the respective lugs 70. Between each pair of lugs 70, the outer surface of the sleeve 65 is formed as a cam surface 74. The rollers 71 operate to permit clockwise rotation of the sleeve 65, and consequently of the drum 62, but prevent counterclockwise rotation of such elements. As will become apparent, the drum 62 rotates with the transmission as a unit when the latter is in high gear, that is, in low transmission ratio, but the drum 62 remains stationary when the transmission is in the lower gear, or higher transmission ratio.

Torque responsive means are provided for permitting reverse or counterclockwise rotation of the collar 54, and consequently the plates 40 and 43, with respect to the drum 62. Referring to Figures 1 and 2, the numeral 74 designates a sleeve or collar keyed as at 75 to the drum 54. The collar 74 is illustrated in detail in Figure 15. This collar includes radially outstanding lugs 76 extending outwardly substantially into contact with the cylindrical drum wall 63 and relatively rotatable with respect thereto. At one end, each lug 76 is provided with a smaller longitudinally extending lug 77 extending through openings 78 formed in the drum wall 64. It will be apparent that the sleeve 74 is rotatable with respect to the drum 62, and relative rotation between these members is limited by the arrangement of the lugs 77 in the openings 78.

Figures 5, 6, 7, 8, 9:
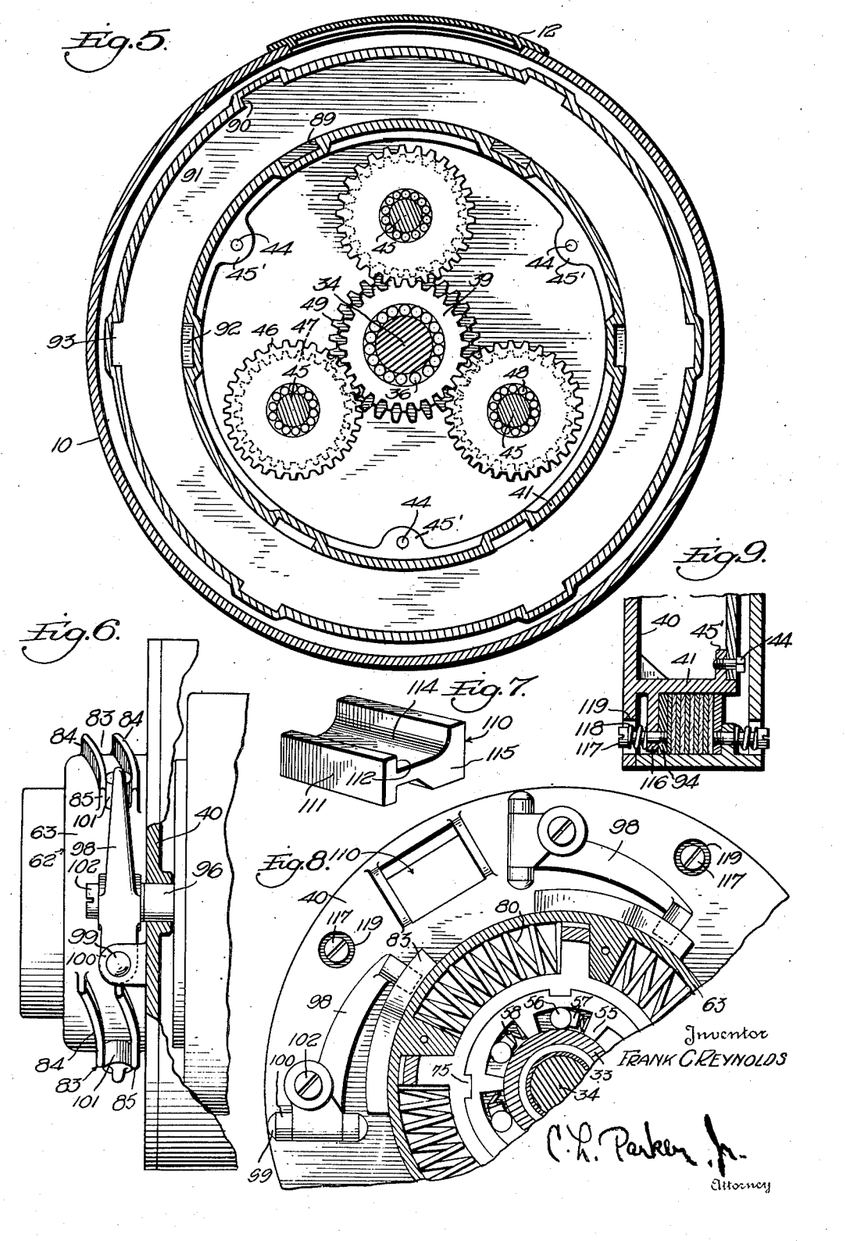
Figure 5 is a transverse vertical sectional view on line 5—5 of Figure 1.
Figure 6 is a side elevation of a portion of the clutch operating mechanism, parts being shown in section and parts being broken away.
Figure 7 is a detailed perspective view of one of the centrifugal weights.
Figure 8 is a fragmentary sectional view similar to Figure 2 showing a slightly modified form of the clutch mechanism.
Figure 9 is a detailed sectional view similar to Figure 4 showing the portion of the clutch as used in connection with the form of the device illustrated in Figure 8.

Referring to Figure 2, it will be noted that the drum wall 63 is provided with relatively heavy inwardly extending lugs or bosses 79. These bosses normally contact with the bosses 76, thus limiting the turning movement of the collar 74 in a clockwise direction with respect to the drum wall 63. A relatively heavy coil spring 80 contacts at one end with each of the lugs 79 and at its other end with the next remote lug 76. It will be obvious that the springs 80 resist counter-clockwise turning movement of the sleeve 74 with respect to the drum 62. The rear face of the drum 62 is closed by a cover plate 81 (see Figure 1) secured in position by means of screws 82 which may be threaded into the lugs 79, as shown in Figure 2. The outer face of the drum wall 63 is provided with a plurality of trackways 83, each of which is formed by a pair of fins 84 angularly arranged throughout the greater portion of their length to slope away from the wall or plate 40. The ends of the fins 84 at the inner end of each trackway are arranged substantially parallel to the plate 40, as shown in Figure 6. The purpose of the trackways 84 will be referred to later in detail.

The plate 40 constitutes one unit of a clutch carrier, and the other unit of such carrier comprises a radial plate 85 provided with a hub portion 86 splined to the shaft 34 and journalled in a bearing 87 carried by the rear casing wall 15. The plate 85 is provided with an outer cylindrical flange 88 extending forwardly into proximity to the plate 40, surrounding and in spaced relationship to the flange 41. The flanges 41 and 88 are provided with circumferentially spaced recesses 89 and 90 respectively. A plurality of clutch plates 91 are arranged between the flanges 41 and 88. Alternate clutch plates are provided with internal and external bosses 92 and 93 engageable respectively in the recesses 89 and 90.

The clutch plates 91 are frictionally engageable to lock the plates 40 and 85 together for rotation as a unit, and they are releasable to permit rotation of the plate 85 independently of the plate 40 and associated elements. The means for accomplishing these functions form important parts of the present invention. As previously stated, prior transmissions such as the apparatus disclosed in my prior Patent No. 1,972,107, referred to above are operative for varying the transmission ratio in accordance with torque reactions, whereas other types of automatic transmissions operate to vary the transmission ratio in accordance with engine or vehicle speeds. While variation in the transmission ratio in accordance with torque reactions is highly preferable to a transmission which is purely speed responsive, neither type of transmission fully meets the desired requirements, and it will become apparent that the present apparatus combines the desirable characteristics of the speed and torque responsive transmissions but eliminating the disadvantages thereof. These results are accomplished largely through the means for engaging and releasing the clutch plates 91, in combination with the other elements of the apparatus.

Referring to Figures 1 and 4, numeral 94 designates a clutch pressure plate movable with the plate 40 and flange 41 by means of a lug 95, similar to one of the lugs 92 and engageable in one of the recesses 89. The pressure plate 40 is provided with a plurality of forwardly extending pins 96 slidable in openings 97 formed in the plate 40. A plurality of levers 98 is arranged forwardly of the plate 40 and correspond in number to the pins 96, four of the levers 98 and four of the pins 96 being employed in the embodiment of the invention illustrated. Each lever 96 is pivotally supported at one end by a pivot pin 99 passing through ears 100 carried by the plate 40. The other end of each lever is provided with a radially inwardly projecting boss 101 operating in one of the trackways 83. Each lever is further provided with an operating screw 102, engageable against one of the pins 96. Swinging movement of the levers 98 about their pivots 99 is accomplished by relative rotation between the plate 40 and drum 62 to vary the pressure of the plate 94 against the clutch plates 91, in a manner to be described.

The elements previously described operate to vary the frictional engagement of the clutch plates 91 in accordance with torque variations, and such means is operative either alone or in conjunction with means responsive to the speed of rotation of the plate 85. Referring to Figures 1 and 4, the numeral 103 designates a clutch pressure plate similar to the pressure plate 94 and rotatable with the flange 88 and plate 85. The flange 88 is provided with an internal radial flange 104 against which the pressure plate 103 seats to limit its outward movement. At circumferentially spaced points, screws 105 extend through the flange 104 and are threaded in the plate 103. A spring 106 surrounds each screw 105, outwardly of the flange 104, to tend to move the pressure plate 103 outwardly to relieve the pressure of the clutch plates. The screws 105 extend through openings 107 formed in the plate 85.

The plate 85 is provided with a plurality of openings 108, preferably arranged between alternate pairs of the screws 105, and the openings are defined on opposite sides by outwardly extending ribs 109. Centrifugal weights are operable between the ribs 109. These weights are shown in Figures 1 and 3, and one of the weights is illustrated in perspective in Figure 7. Each weight is indicated as a whole by the numeral 110 and includes an inner flange 111 normally arranged in the vertical plane of the flange 104, as shown in Figure 1. The radially inner end 112 of each flange 111 normally seats against the end of an inturned flange 113, formed integral with the plate 85 and forming the inner extremity of each opening 108. The radially inner face of each weight 110 is shaped as at 114 to conform to the shape of the flange 113 and its curved connection with the plate 85. The radially outer portion of each weight 110, at a point remote from the flange 111, is thickened as at 115 to suitably increase the effective mass of the weight. Upon rotation of the plate 85 the portion 115 of each of the weights tends to swing radially outwardly, the flange portion 112 fulcruming against the adjacent end of the flange 113. Under such conditions, the radially outer portion of each flange 111 exerts a pressure against the plate 103 tending to move it inwardly to effect frictional engagement of the clutch plates 91. This tendency is overcome only to a limited extent by the return spring 106 associated with the pressure plate 103.

For most installations, the set of speed weights 110 is wholly sufficient, and attention is invited to the fact that these weights are carried by the plate 85 and associated elements, which are constantly rotated during the operation of the transmission. Accordingly, these weights function at the proper time without the necessity for the building up therein of the necessary kinetic energy. If desired, however, these weights may be supplemented by an additional set of weights carried by the plate 40, as illustrated in Figure 8. The weights so employed are identical with the weights previously described, and this is true of the openings in which the weights operate. No specific description of such elements accordingly is necessary, and they have been designated by the same reference numerals as in the form of the invention already described. Where the set of weights is employed in conjunction with the plate 40, however, it is desirable to provide a return spring for the clutch pressure plate 94. Referring to Figure 9, the numeral 116 designates a flange carried by the cylindrical flange 41 and provided with screws 117 threaded at their inner ends in the pressure plate 94. A spring 118 urges each screw 117 outwardly, and the heads of these screws project through openings 119 formed in the plate 40. The flange 116 is suitably cut away at spaced points to receive the inner ends of the weights 110 associated therewith, as will be apparent.

The reverse gear and the lowest forward gear are arranged in the rear casing section 11 and are provided with suitable control means. Referring to Figure 1, it will be noted that the shaft 34, rearwardly of the spline portion 50, extends into the housing 11 and is provided with outstanding spline ribs 120. A driving collar 121 surrounds the rear end of the shaft 34 and is provided with two sets of inwardly extending spline ribs 122 and 123, spaced from each other as at 124, for a purpose to be described. It will be noted that the ribs 122 are always in engagement with the ribs 120, and accordingly the collar 121 is always positively driven. The collar 121 is provided with an external groove 125 engageable by a shift fork 126 carried by a collar 127 secured to a transverse shaft 128.

A shaft 129 has its forward end journalled in a pilot bearing 130 arranged within the rear end of the shaft 34, and the forward end of the shaft 129 preferably engages a ball thrust bearing 131. A retaining ring 132 is threaded on the shaft 129 and holds a driving ring 133 in position on the shaft 129. This ring is splined or keyed to the shaft 129 as at 134, and is provided with outstanding spline ribs 135, corresponding in number and arrangement to the ribs 122 and 123 of the collar 121. The length of the ribs 135 is slightly less than the width of the space 124, and accordingly the collar 121 is movable to a position in which the ring 133 will not be driven by the collar 121.

A short driven shaft 136 is journalled in bearings 137 mounted in the rear end of the casing 11. A sleeve 138 is splined on the shaft 136 and carries a coupling 139 at its rear end for connecting the sleeve 138 to the propeller shaft universal joint (not shown). The shaft 136 carries a worm 140 meshing with a worm wheel 141 by which the vehicle speedometer is driven. The rear end of the shaft 129 is journalled in bearings 142, mounted in the forward end of the shaft 136, and a ball thrust bearing 143 is provided for the rear end of the shaft 129. At its forward end, the shaft 136 is provided with a crown wheel gear 144, for a purpose to be described.

A reverse bevel gear 145 is mounted on bushings 146 surrounding the shaft 129, and it will be apparent that the gear 145 is freely rotatable on the shaft 129. The gear 145 has a forwardly projecting hub 147 engaging against the driving ring 133, and the forward end of the hub 147 is provided with outstanding spline ribs 148, engageable with the ribs 123 of the collar 121 when the vehicle is in reverse and when the drive is direct through shafts 34, 129 and 136, as will be later referred to in detail. The rear bushing within the gear 145 seats against a radial flange 149, formed integral with the shaft 129.

A hub 150 surrounds the shaft 129 rearwardly of the flange 149 and rotates on bushings 151. The forward end of the forward bushing 151 engages against the flange 149. The hub 150 is provided with diametrically opposite spindles 152 and the outer end of each spindle is arranged in a socket 153. Each spindle 152 carries a pair of preferably integral gears 154 and 155 meshing respectively with the reverse gear 145 and the crown wheel gear 144. Each pair of gears 154 and 155 is rotatably supported on its associated spindle 152 by bushings 155'. Bevel gear 156 is splined on the shaft 129 and meshes with each of the gears 154. The gear 156 is retained in position by a collar 157 threaded on the shaft 129.

Figure 10:
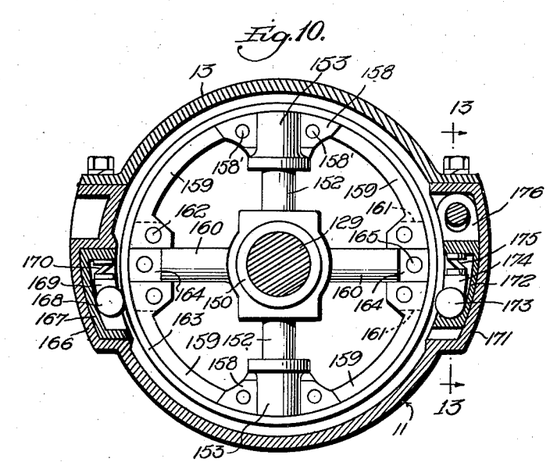
Figure 10 is a transverse vertical sectional view on line 10—10 of Figure 1, parts being omitted.

Referring to Figure 10, from which the gears in the housing 11 have been omitted for the purpose of illustration, it will be noted that the sockets 153 are preferably solid and each carries a pair of ears 158 and oppositely extending arcuate ribs or arms 159, preferably formed integral therewith. The hub 150 carries a pair of diametrically opposite arms 160, arranged ninety degrees from the spindles 152, and provided with oppositely extending lugs 161 at their ends. The arms 159 are bolted to these lugs as at 162. A continuous circumferential band 163 surrounds the arms 159 and the ends of the sockets 153 and arms 160. The band 163 is provided with six inwardly extending lugs 164, two of which are bolted as at 165 to the lugs 161, while the remaining four are bolted to the ears 158 as at 158'. Accordingly it will be apparent that the band 163 is rotatable with the hub 150, arms 160 and spindles 152, around the axis of the shaft 129.

An overrunning clutch is operative at all times to prevent rotation of the band 163 in a counterclockwise direction. The casing 11 is provided adjacent one side with an off-set 166 in which is arranged a clutch carrier 167. This carrier contains a roller 168 engaging the periphery of the wheel 163, and the inner face of the carrier 167 is formed as a cam to wedge the roller 168 against the wheel 163 upon downward movement of the roller 168. A shoe 169 engages the roller 168, and a spring 170 exerts a downward force tending to lock the roller 168. When the vehicle is in its lowest gear the wheel 163 tends to revolve in a counterclockwise direction, for a reason which will become apparent, and under such conditions, counterclockwise rotation of the wheel 163 is prevented whereby the drive through the casing 10 is accomplished by rotation of the gears 154 and 155 on the spindles 152 without bodily rotation of these gears around the axis of the shaft 129.

When the vehicle is in reverse gear the wheel 163 tends to rotate in a clockwise direction, and under such conditions, clockwise rotation of the wheel 163 is prevented. The casing 11 is provided with an off-set 171, opposite the off-set 166, and provided with a vertically movable clutch carrier 172 containing a clutch roller 173. A shoe 174 is arranged against the roller 173 and is urged downwardly by a spring 175. The inner faces of both the off-set 171 and the carrier 172 are formed as cam surfaces, and when the carrier 172 is adjacent the bottom of the off-set 171, the roller 173 is adapted to engage the wheel 163 and prevent clockwise rotation thereof. When the carrier 172 is elevated to the position shown in Figure 10, and the roller 173 is at the lower extremity of the carrier 172, there will be a slight clearance between the roller 173 and the wheel 163, thus permitting free clockwise rotation of the wheel 163 and associated parts.

Figure 13:
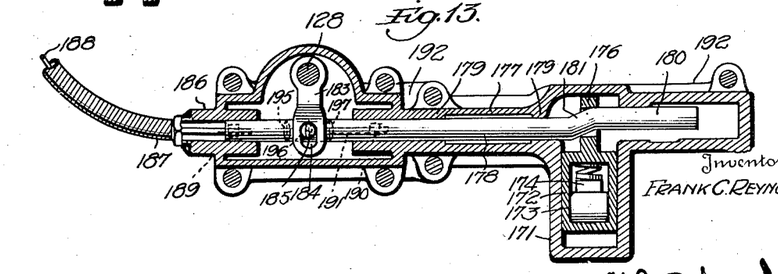
Figure 13 is a longitudinal vertical sectional view on a plane parallel to Figure 1 and taken substantially on line 13—13 of Figure 10.

Referring to Figures 10 and 13, it will be noted that the carrier 172 is provided with an upwardly extending ear 176. The off-set 171 is arranged below a longitudinal off-set 177 carried by the housing 11. The extension or off-set 177 houses a longitudinally movable shift rod 178 mounted for rectilinear movement in slide bearings 179 and the rear end of the rod 178 is provided with a vertically off-set portion 180 connected to the forward end of the rod by a sloping cam portion 181. When the rod 178 is in the position shown, the clutch carrier 172 is in its elevated position and the wheel 163 is freely rotatable in a clockwise direction. This is the condition which is present when the drive through the casing 11 is direct and the various gears in the casing 11 are locked against relative movement.

Figures 14, 15:
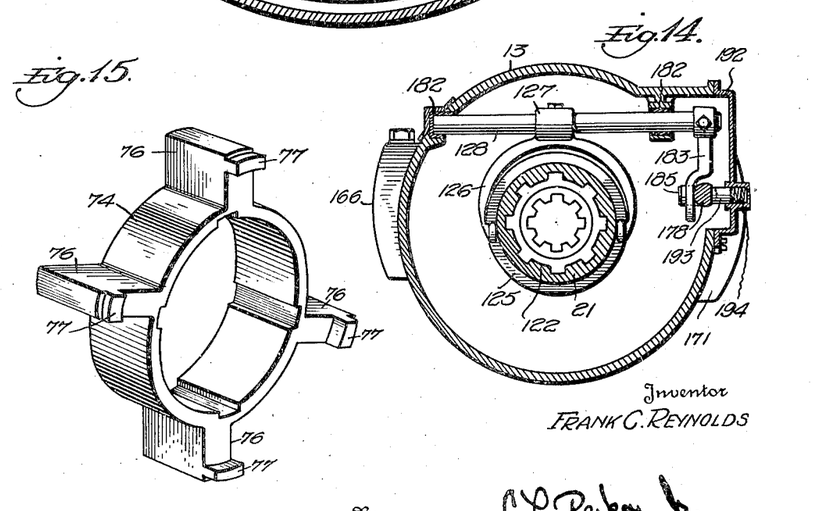
Figure 14 is a section on line 14—14 of Figure 1.
Figure 15 is a detailed perspective view of one of the elements of the torque reaction device.

Referring to Figure 14, it will be noted that the rock shaft 128 is journalled in bearings 182 formed in the cover 13 of the housing 11. One end of the shaft 128 carries a depending arm 183 which is slotted at its lower end as at 184 (see Figure 13) to receive an outstanding pin 185 carried by the shift rod 178. Accordingly it will be apparent that the rocking of the shaft 128 operates the shift fork 126 and simultaneously moves the rod 178 longitudinally.

The forward end of the casing off-set 177 is provided with a bearing 186 for the forward end of the rod 178, and the casing 187 of a Bowden wire 188 is secured to the forward end of the bearing 186. The Bowden wire extends into a suitable opening in the forward end of the rod 178 and is secured thereto by a set screw 189. One of the bearings 179 may be provided with a guide screw 190 engaging in a slot 191 formed in the rod 178 to prevent turning movement of the rod.

A cover 192 is provided for the horizontal portion of the casing off-set and may be removed to provide access to the various elements therein, such as the screws 189 and 190. This cover also carries a detent 193 urged inwardly by a spring 194 to selectively engage notches 195, 196 and 197, formed in the rod 178.

Figure 16:
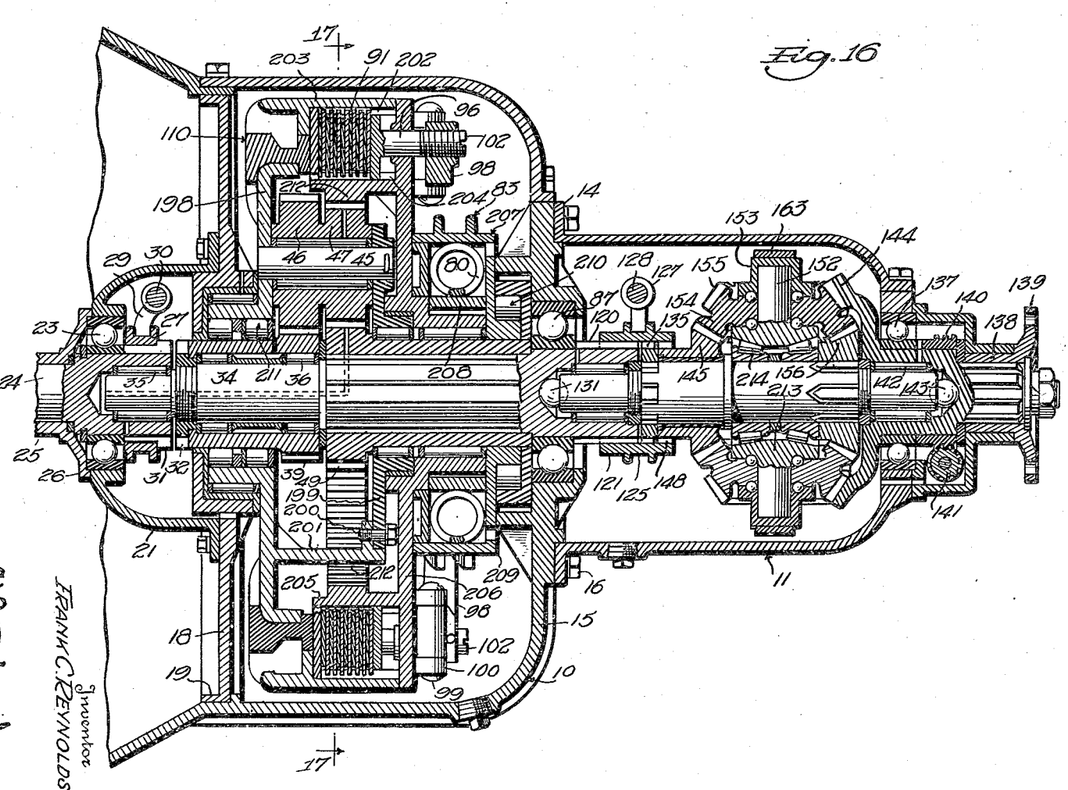
Figure 16 is a central vertical longitudinal sectional view through a modified form of transmission.
Figure 17:
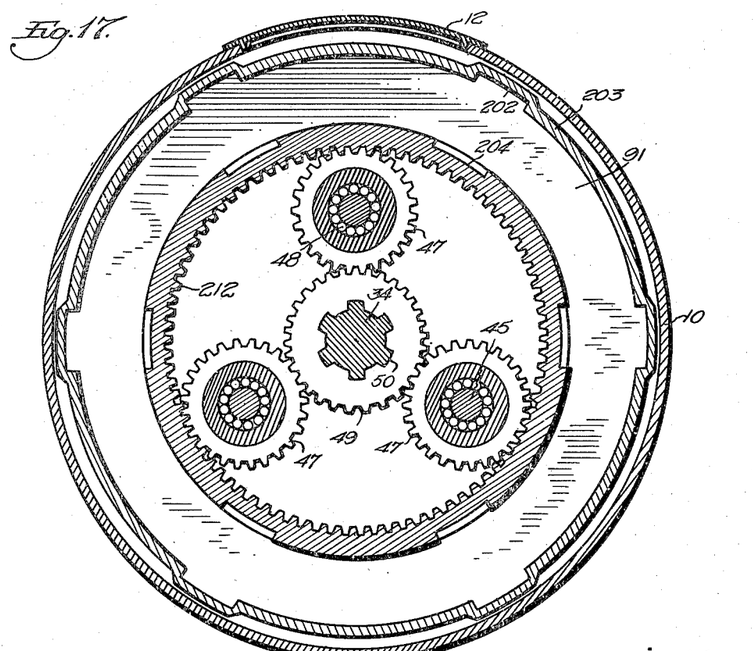
Figure 17 is a section on line 17—17 of Figure 16.

In the form of the invention shown in Figures 16 and 17, substantially the same action takes place as in the form previously described, the principal difference lying in the means for transmitting movement from the planetary gears to the driven elements of the apparatus. In view of the similarity between the two forms of the invention, a specific description of all of the parts is believed to be unnecessary, and where identical elements have been employed, such elements will be designated by the same numerals as in the form previously described. It will be noted that the shaft 24 is coupled to the shaft 34 in the same manner as in the previous form, through the medium of the sliding clutch collar 27. The driving pinion 39 meshes with each of the planetary gears 46, but the mounting of these gears is somewhat different than in the form previously described. The shafts 45 are supported at their forward ends in a plate 198, similar to the rear plate 85 previously described, while the rear ends of the shafts 45 are supported by a plate 199 secured as at 200 to a plurality of segmental arcuate flanges 201, formed integral with the plate 198 and extending between the sets of planetary gears.

The clutch mechanism per se is identical with the form previously described and includes the same clutch plates 91. Alternate clutch plates are locked with respect to the plate 198 by longitudinal recesses 202 formed in a cylindrical flange 203 which is preferably integral with the plate 198. The remaining clutch plates are locked by means of longitudinal recesses 204 formed in a cylindrical flange 205 integral with a plate 206. It will be apparent that the plates 198 and 206 are substantially identical with the plates 40 and 85, previously described, except that their position is reversed. It also will be apparent that the speed controlled weights are carried by the plate 198, while the torque responsive levers 98 are carried by the plate 206. The function and structure of these elements being identical with the previously described form of the invention, such elements need not be referred to in detail.

The plate 199 operates in conjunction with a torque responsive device indicated as a whole by the numeral 207 and including an inner element 208 corresponding to the ring 74, and an outer drum 209, corresponding to the drum 62 and locked against reverse rotation by an overrunning clutch 210. Since the plate 198 in the present case constitutes the driven element corresponding to the plate 40, it is provided with an overrunning clutch 211 corresponding to the clutch including the rollers 56. Thus reverse rotation of the plate 198 is prevented.

As previously stated, the operation of the automatic elements of the transmission shown in Figures 16 and 17 is quite similar to the form previously described. As in the previous case, the drive in low gear is from pinion 39, through planetary gears 46 and 47 and sun gear 49. However, the gears 47 in the modified form of the invention mesh with an internal ring gear 212 instead of transmitting forces through the shafts 45.

The operation of the elements within the housing 11 is identical with the form previously described, including the operation of the shift collar 121 and the gears 144, 145, 154, 155 and 156. In the present case however, the bushings 151 are eliminated and a slightly different form of hub 213 is substituted for the hub 150 and is mounted on tapered roller bearings 214.

The operation of the apparatus is as follows:
With the parts in the position shown in Figure 1, the vehicle is at rest and the clutch 31 is disengaged. Accordingly, there is no torque on the driven shaft 34 and the springs 80 of the torque reaction devices are extended to their full length, and the bosses 101 of the levers 98 are in the portions of the trackways 83 nearest the plate 40, that is, in the parallel portions 85. The clutch pressure plate 94 accordingly will be moved inwardly to its limit of movement. The centrifugal weights 110 will be at rest and accordingly will occupy their normal positions shown in Figure 1, and accordingly the clutch plates 91 will not be operatively engaged.

When it is desired to start the vehicle, the main vehicle clutch (not shown) to which the shaft 24 is connected, is disengaged, whereupon the shaft 30 is rocked to move the collar 27 rearwardly and bring the clutch fingers 31 into engagement with the fingers 32. In this connection it will be noted that the construction involves the use of the sliding clutch collars 27 and 121, and the former is employed only to render the transmission as a whole operative and inoperative. For simplicity in operation, the control means for the clutch collar 27 is preferably placed on the steering collar, while the control for the clutch collar 121 preferably is placed on the instrument panel of the vehicle.

Figure 12:
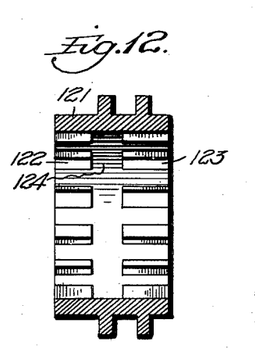
Figure 12 is a detailed sectional view through the low and reverse gear shifting collar.

If the vehicle is to be driven forwardly under normal conditions the clutch collar 121 is permitted to remain in its intermediate position in which the detent 193 is arranged in the notch 196. Under such conditions, the spline ribs 122 (see Figures 1 and 12) engage the driving ribs 120, while the ribs 123 engage the ribs 135 of the driving ring 133 and the ribs 148 of the bevel pinion 145. Accordingly it will be apparent that all of the transmission elements in the rear housing 11 will be locked together for rotation as a unit, and there will be no rotation of the gears 154 and 155 about the spindles 152. Moreover, it will be apparent that under such conditions the rod 178 will be in the position shown in Figure 13 whereby the clutch carrier 172 (see Figure 10) will be elevated to render the clutch roller 173 inoperative. Rotation under such conditions will be clockwise as viewed in Figure 10 and the clutch roller 168 does not affect such operation.

If the main vehicle clutch is now engaged and the throttle progressively opened, torque will be delivered to the driving pinion 39 and the planet gears 46 and 47 will rotate in a counterclockwise direction around the sun gear 49. In this connection it will be noted that the operation is started with the vehicle at rest, and accordingly a torque reaction operates through the sun gear 49 to initially prevent rotation thereof.

Upon the reverse or counterclockwise rotation of the planet gears around the sun gear 49, the shafts 45 transmit movement to the plate 40 and hub 54, and consequently to the sleeve 74. The torque responsive springs 80 tend to transmit the same rotation to the drum 62 as will be apparent from an examination of Figure 2, but reverse rotation of the drum 62 will be prevented by operation of the overrunning clutch rollers 71. Accordingly the lugs 76 will rotate counter-clockwise with the plate 40 and will compress the springs 80 while the trackways 83 will remain stationary with the drum 62. Thus the lever lugs 101 will move counterclockwise in the trackways 83 and the pin 102 of each lever 98 will release the plate 94, thus preventing any operative engagement between the clutch plates 91.

When the force of the torque responsive springs 80 equals the torque reaction on the sun gear 49, or the lugs 77 reach the limits of the openings 78 in the drum 62, the plates 40 and 43 will remain stationary while the planet gears 46 and 47 will rotate around the axes of the shafts 45. The meshing of the gears 47 and 49 transmits power to the shaft 34 in what may be termed the "intermediate" gear. As previously stated, the elements in the housing 11 are locked for rotation as a unit and accordingly a straight line drive is provided from shaft 34 to shaft 129, and thence through the shaft 136 to the propeller shaft of the vehicle.

It will be noted that the plate 85 is splined to the shaft 34, as at 50, and accordingly the plate 85 will be rotated with the shaft 34. If the throttle is progressively opened, the centrifugal force affecting the speed weights 110 will progressively increase with the gear speed, thus causing the weights 110 to swing outwardly. The greatest mass of these weights is in the portion 115 thereof, and such portion of each weight swings outwardly in the guides 109, the weights pivoting at the point of contact between the flanges 112 and 113.

The swinging of the speed weights outwardly transmits inward movement to the pressure plate 103, thus moving the clutch discs 91. The weights will continue to move outwardly until their movement is limited by the outer ends of the openings 108, and this movement, under the conditions being considered, is permitted by virtue of the fact that the pressure plate 94 is released due to the action of the levers 98 in response to the action of the torque responsive device. Accordingly, the vehicle may be accelerated in the intermediate gear referred to to a substantial speed by the continued opening of the throttle to maintain the necessary torque reaction for releasing the pressure plate 94. The condition referred to will be maintained, in other words, so long as the driving torque of the engine and the torque reaction on the gear 49 are sufficient to maintain the springs 80 under such compression as to hold the pressure plate 94 released.

Whenever the driver desires to go into high gear, he may accomplish this action by the simple expedient of releasing the accelerator to close the throttle momentarily, thus releasing one of the forces by which the springs 80 have been maintained compressed. The releasing of the engine torque will cause the springs 80 to expand and thus restore the parts of the torque reaction device to the normal position shown in Figure 2, the lugs 101 of the levers 98 returning to the position shown in Figures 2 and 6 and moving the pressure plate 94 inwardly to cause operative engagement of the clutch plates 91. The transmission will thus be placed in high gear by the locking of the plates 40 and 85 to each other. It will be apparent that the shaft 34 under such conditions will be driven by the plate 85 instead of through the planetary gearing, and all of the elements within the housing 10 will rotate as a unit. As previously stated, the throttle need be closed only momentarily and then may be opened as desired. The full inward movement of the pressure plate 94 causes the weights 109 to be swung inwardly from their fully operative positions. Assuming under the conditions referred to that the vehicle is traveling at a moderate speed and the driver desires to accelerate to higher speeds, the accelerator is depressed to open the throttle wider, but no slippage will take place between the discs. The weights 110 will have been moved inwardly by the full inward movement of the pressure plate 94, and the increased speed incident to the opening of the throttle will generate increased centrifugal force in the weights 110 to tend to move them outwardly and thus increase the pressure of the plate 103 against the clutch plates.

At the opposite side of the clutch, the pressure plate 94 is tending to oppose the force of the speed weights. The increased force of the weights is transmitted through the clutch discs and the pins 96 and 102, thus transmitting a force to the lever 98 transversely of the trackways 83. Thus outward movement of the pressure plate 94 is prevented and the variation in the ratio of the driving and reaction torques cannot act on the torque responsive device under such conditions, assuming that the vehicle in the direct drive referred to has attained a speed above approximately fourteen miles per hour. In this connection it will be noted that when the car is started from a standstill, the weights 110 are at rest and exert no pressure on the clutch plates 91, and as the gear is started in motion the weights move outwardly freely until their movement is limited by the outer ends of the openings 108. Accordingly, as the initial torque reaction operates in the manner described to release the pins 96 and pressure plate 94 the weights 110 transmit no pressure to the clutch plates and the clutch remains disengaged until engagement is effected in the manner described.

The operation of the apparatus upon a substantial increase in the torque load, as when the vehicle starts to ascend a grade, will now be considered. Assuming that the vehicle is in the direct low ratio or high gear drive, traveling at a substantial speed, and the vehicle starts to ascend a substantial grade, it will be apparent that the torque load is increased, thus reducing the engine speed. When the vehicle speed is retarded to or below the approximate speed of fourteen miles per hour, the reduction in the centrifugal force affecting the weights 110 causes these weights to start to release the clutch discs. As soon as the pressure of the weights is released from the clutch discs and before any slippage can occur, the increased torque reaction operates in the manner previously described to compress the springs 80 and thus operate the levers 98 to release the pressure plate 94. In this connection it will be noted that as long as the pressure exerted by the centrifugal weights is above a predetermined point, the pressure operating against the trackways 83 by the lever lugs 101 prevents operation of the torque responsive device. Hence, under the conditions being considered, the action of the torque responsive device to release the pressure plate 94 takes place upon a predetermined reduction in the transverse pressure of the lever ends against the trackways. The vehicle speed at which such change occurs may be determined, of course, by the masses of the weights.

Upon the releasing of the clutch plates when the torque responsive device releases the pressure plate 94, the transmission returns to the intermediate gear condition previously described, the plate 40 remaining stationary and the drive being transmitted by rotation of the planet gears on their own axes. The change in the driving ratio will then cause the engine to accelerate its speed and the engine accordingly operates automatically at a point closer to its most efficient speed. The vehicle also will be accelerated in the intermediate gear until the speed reaches the predetermined speed referred to, namely fourteen miles per hour, whereupon the weights 110 will again move outwardly until they abut the outer limits of the openings 108, but since the other side of the clutch is released because of the torque reaction, they will not lock the discs and the vehicle may be accelerated to the crest of the grade. The change to the direct drive or high gear then may be made in the manner previously described, namely by momentarily closing and then opening the throttle.

The apparatus operates to eliminate the shocks to which ordinary transmissions are subjected. In a conventional construction, the main clutch is engaged in starting the car from a standstill, and every part of the vehicle is subjected to shock and resulting stresses as the gear is started in motion. When accelerating the vehicle speed, the torque at the driving axle may be such that it cannot be absorbed by the wheels, and hence there is slippage of the wheels with consequent injury to the tires.

With the present construction, the main vehicle clutch may be quickly engaged with the throttle substantially opened and there will be no shock transmitted to the parts of the vehicle since the torque is absorbed by the springs of the control drum. The planet gears turn backward about the sun gear under the conditions referred to, thus providing infinite changes in gear ratio as the car is placed in motion. The torque delivered to the driving axles will be no greater than the wheels can absorb, and acceleration without injury to the parts may take place more rapidly than with any prior construction of which I am aware.

The starting of the vehicle from a standstill has been described from the standpoint of the operation of the vehicle by a driver who desires rapid acceleration. On the other hand, there are many drivers who accelerate their vehicles very slowly when starting from a standstill, and the present transmission operates perfectly when the vehicle is so operated. Assuming that the vehicle is started relatively slowly from a standstill, the torque reaction will be relatively slight and may be so slight as to prevent the releasing of the pressure plate 94. The starting of the vehicle takes place with the parts in the normal position shown in Figure 2, the springs 80 being fully released and the pressure plate 94 being arranged at its innermost limit of movement. The torque reaction when starting slowly may be so slight as to prevent the lever lugs 101 from moving out of the parallel portions 85 of the trackways 83, and the pressure plate 94 will remain in the position in Figure 1 during initial acceleration of the vehicle.

As the vehicle speed slowly increases, the centrifugal force tending to move the weights 110 outwardly will progressively increase and their movement will be resisted by the position of the pressure plate 94. However, when the vehicle speed reaches approximately fourteen miles per hour the centrifugal force then generated in the weights 110 will provide driving engagement between the clutch discs 91 and the transmission automatically will change over into the high gear condition.

If the driver should accelerate slowly to a speed less than fourteen miles per hour and should then decide to increase the rate of acceleration, he may open the throttle substantially wider, whereupon the increased torque reaction will compress the springs 80 in the manner previously described, and the change to the high gear drive will not occur automatically at fourteen miles per hour since the pressure plate 94 under such conditions will be retracted. The change over to high gear may then be determined by the driver when he feels that sufficient vehicle speed has been attained, this result being accomplished in the manner previously described by momentarily closing the throttle and then opening it.

When the vehicle is accelerated slowly and the change to high gear occurs automatically at fourteen miles per hour by the automatic action of the weights 110, there will be little slipping and wearing of the clutch plates. Under the conditions referred to, the slight torque reaction is insufficient to cause any slipping of the clutch plates. The tendency toward slippage occurs only under high torque conditions, and with the present transmission, the weights cannot function alone under high torque conditions to cause engagement of the clutch plates due to the releasing of the pressure plate 94.

In this connection it will be noted that the centrifugal weights operate merely to place the discs 91 in position for operation, the operative engagement of the discs 91 being determined in accordance with torque reaction. The disengagement of the discs under increased torque, as when ascending a grade, takes place when the weights release their pressure slightly incident to decreased vehicle speed, whereupon the torque reaction operates to compress the springs 86 quite suddenly. This it will be apparent that quick engagement and disengagement of the discs takes place to prevent slippage and wear of the clutch plates, which action would not be possible with the use of centrifugal force alone.

As previously stated, the elements in the housing 11 provide reverse movement and a lower gear than the intermediate gear ratio developed in the housing 10. During normal driving the shaft 34, ring 133 and gear 145 are locked together for rotation as a unit. When it is desired to use the lowest gear, under extreme conditions, the shaft 128 is rocked to move the sleeve 121 forwardly. This action disengages the ribs 123 from the ribs 148, thus freeing the gear 145 for rotation about the axis of the shaft 129. The drive then will be from shaft 34 through collar 121 to the shaft 129 and gear 156. This gear rotates the gears 154, which action is permitted by the freeing of the gear 145. A reverse reaction is caused tending to rotate the spindles 152 counterclockwise around the shaft 129, and this action is prevented by the clutch roller 168. The wheel 163 and associated elements will then be held stationary, and the drive will be delivered from gear 156 to gears 154 and gears 155, rotating on the axis of the spindles 152, and thence to the gear 144.

In connection with the low gear drive, particular attention is invited to the fact that this gear may be employed at any time without desengaging the main vehicle gear since shifting of the collar 121 does not engage gears, clutches or other elements, but on the contrary, such action merely releases the gear 145.

The use of the reverse gear involves largely the same theory of operation as the low gear drive. Instead of moving the collar 121 forwardly, as in low gear, it is moved rearwardly when reverse movement is desired. The ribs 123 then remain in engagement with the ribs 148, but the ribs 135 will be placed in the space 124 (see Figure 12) to thus release the ring 133 and shaft 129. The drive will then be from shaft 34, through collar 121 and gear 145, and thence to the gears 154. This action tends to cause the spindles 152 to rotate about the shaft 129 in a clockwise direction, which action is prevented by the clutch roller 173.

In this connection attention is invited to the fact that when the shaft 128 is rocked to move the collar 121 rearwardly, the rod 178 will be moved rearwardly and the cam portion 181 of such rod will effect downward movement of the carrier 172 and thus render the roller 173 operative for preventing clockwise rotation of the wheel 163 and the elements connected thereto. The spindles 152 will then remain stationary, and the rotation of the gears 154 and 155 will transmit reverse rotation to the gear 144.

The operation of the form of the invention shown in Figures 16 and 17 is quite similar to the form previously described and need not be referred to in detail. In the form of the invention shown in Figure 16, the ring gear 212 is employed, meshing with the planet gears 47. When operating in intermediate gear, the members 198 and 199 rotate around the ring gear together with the planet gears, the plate 206 remaining at rest. The planet gears and the members rotating therewith build up a substantial rotating force in intermediate gear, and as the transmission changes over to high gear, the rotating bodies referred to give up their kinetic energy to assist in rotating the driven elements. Accordingly, the spring controlled drum 207 is required to impart motion only to the plate 206, while in the form of the invention illustrated in Figure 1, the spring drum 62 must rotate the members 40 and 43, together with the planet gears, as the change to high gear is effected.

Attention is invited to the fact that in both forms of the invention the speed weights are carried by elements which rotate continuously whenever the transmission is in operation, and this fact is of great importance. In some forms of automatic transmissions using planetary gears, the centrifugal clutch is mounted on the carrier for the planetary pinions. When operating in second or intermediate gear, such carrier is held stationary together with the centrifugal weights. If the driver then lifts his foot from the accelerator pedal, the carrier and associated parts are set in motion by the momentum of the vehicle and the centrifugal force on the clutch weights presses a band against the inside of a drum mounted on the driving member.

In such case two masses of great inertia are provided, whose relative speeds are materially different, and these two masses are suddenly coupled together, except for the limit set on the resulting stresses by the slippage of the clutch. This slippage is substantial in an apparatus of such character, and it will be apparent that since the weights are started from rest by the momentum of the gear, they would not have sufficient time to exercise their full centrifugal force before engaging, and accordingly the clutch slippage occurs to a substantial extent. In the present construction the weights are continuously in motion and are moved to the position of clutch engagement by centrifugal force before engagement of the clutch takes place, except in the case of very slow acceleration of the vehicle. In the latter case, as previously explained, the torque reaction is insufficient for causing clutch slippage.

As previously stated, the weights are carried by a constantly rotating part of the apparatus, but if desired, additional weights may be employed in conjunction with the plate 40. While these additional weights would be stationary in intermediate gear, they would not have to be depended upon for clutch engagement as the change over is made to high gear. Clutch engagement would be effected by the operation of the spring control drums, and the additional weights illustrated in Figure 8 would function simply as adjuncts to the levers 98.

When changing from high to intermediate gear, these additional weights would obviously disengage at the same time as the weights 110, shown in Figure 1. In other words, the additional weights would be at rest at intermediate gear, and as the change to high gear takes place, the plate 40 would rotate clockwise, and as the device rotates as a unit in high gear, the additional weights would move outwardly and add their force to the clutch plate 94. When the additional weights are employed, the clutch 94 would be equipped with the return springs 118, shown in Figure 9.

From the foregoing it will be apparent that the present construction meets the demands of some drivers for maximum acceleration and maximum speed, and it provides economy with quiet operation and durability. When starting the vehicle from a standstill, the engine may be running at a higher speed than would be possible with ordinary constructions and the main clutch may be released quickly, due to the absorption of the shocks by the apparatus. The flexibility of the spring control drum absorbs the initial shock and accordingly the engine tends to retain its speed and delivers its power straight through to the driving axles.

The apparatus does not employ a countershaft, the drive being straight through the transmission, as stated. The transmission accordingly acts as a balance wheel back of the main clutch and it functions inherently to absorb shocks and losses under all conditions. Because of the automatic features of the transmission, it tends to keep the engine operating at a more efficient speed, thus permitting the use of a smaller engine with more efficient operation. The device is far simpler than any automatic transmission of which I am aware, and is extremely durable. There is little to get out of order, and the apparatus employs no valves, pistons or diaphragms which are liable to damage and derangement and are expensive to service.

The apparatus functions automatically to provide the change to high gear when the vehicle is started slowly with minimum torque reaction, and it functions to change from high to intermediate gear automatically upon the building up of an increased torque load followed by a reduction in vehicle speed such as to reduce the pressure exerted against the plate 103 by the weights 110. On the other hand, the vehicle may be maintained in second gear at the will of the operator so long as the torque reaction is above a predetermined point, and the driver, at any time when the vehicle is traveling above a predetermined speed such as fourteen miles per hour, may change over to high gear merely by momentarily closing the throttle and then opening it. The transmission is controlled by two forces, namely speed and torque, and these forces operate separately or simultaneously depending upon operating conditions and the will of the driver. Thus the transmission embodies the advantages of transmissions which are subject to driver demand, as well as automatic transmissions operable by speed or torque reactions, and at the same time, it eliminates the disadvantages of such prior transmissions.

It will be apparent that the engine may be used as a brake when the throttle is closed and the vehicle in high gear. Under such conditions, there will be a prompt deceleration in the speed of driving shaft 24, sleeve 33 and pinion 39. When the vehicle speed is retarded to or below the change over speed of the governor weights, the reduction in the centrifugal force effecting the weights causes them to start to release the clutch discs. As soon as the pressure of the weights is released from the clutch discs and before any slippage can take place, the momentum of the rotating parts tends to cause such parts to rotate at a relatively higher speed than shaft 24, sleeve 33 and pinion 39 which have been slowed down by the engine, but the overrunning clutch 56 functions to lock the plate 40 to sleeve 33. At this time, the momentum of the vehicle causes the shaft 34 to become the driving shaft, while the gear 49 becomes the driving gear. Accordingly the gear 49 will rotate the pinions 46 and 47 counter-clockwise on their own axes at a higher speed than the pinion 39 which has been slowed down by the engine.

The tendency of pinion gear 39 to retard rotation of the planetary gears reacts on the latter and the planetary gears will momentarily rotate counter-clockwise about the axis of the pinion 39. This action, in turn, causes a driving force to be transmitted to the pinion 39 to unlock the overrunning clutch 56 by causing the clockwise rotation of the pinion 39 to exceed the speed of rotation of the plate 40. As the gears 46 momentarily rotate counterclockwise about the pinion 39, the gears 47 will turn backward around the gear 49, and the reversed torque reaction operates in the same manner as when the vehicle is being propelled by the engine and going from direct to second gear ratio, to compress the springs 80 and thus operate levers 98 to release plate 94. All of the parts will then be in the same condition as when in intermediate gear under normal driving conditions, and the engine will operate as a brake to retard the vehicle speed in intermediate gear. The device accordingly has a dual operation and functions just the same when decelerating as when accelerating.

It is to be understood that the forms of the invention herewith shown and described are to be taken as preferred examples of the same, and that various changes in the shape, size and arrangement of parts may be made without departing from the spirit of the invention or the scope of the subjoined claims.

I claim:

1. A transmission comprising a drive shaft, a driven shaft, variable speed transmission mechanism connecting said shafts, clutch mechanism controlling said transmission mechanism, and a pair of means controlling said clutch mechanism from opposite sides thereof for changing the speed ratio of said transmission mechanism, engagement of said clutch mechanism being effected only upon joint operation of said pair of means, one of said means being operative by torque reactions on said driven shaft and the other in accordance with rotational speed.

2. A transmission comprising a drive shaft, a driven shaft, variable speed transmission mechanism connecting said shafts, a clutch controlling said transmission mechanism, and a pair of means simultaneously operable for controlling said clutch from opposite sides thereof for changing the speed ratio of said transmission mechanism, one of said means being operative by torque reactions on said driven shaft, the other said means being constantly rotatable by the driven shaft and responsive to variations in the rotational speed thereof.

3. A transmission comprising a drive shaft, a driven shaft, variable speed planetary gear mechanism connecting said shafts, a clutch controlling said mechanism, and a pair of means simultaneously operable for controlling said clutch from opposite sides thereof for changing the speed ratio of said planetary gear mechanism, one of said means being operative by torque reactions on said driven shaft and the other in accordance with rotational speed.

4. A transmission comprising a drive shaft, a driven shaft, variable speed planetary gear mechanism connecting said shafts, a clutch controlling said mechanism, and a pair of means simultaneously operable for controlling said clutch from opposite sides thereof for changing the speed ratio of said planetary gear mechanism, one of said means being operative by torque reactions on said driven shaft, the other said means being constantly rotatable by the driven shaft and responsive to variations in the rotational speed thereof.

5. A transmission comprising a drive shaft, a driven shaft, variable speed transmission mechanism connecting said shafts, spring pressed means responsive to variations in the torque reactions on said driven shaft for varying the speed ratio of said transmission mechanism, and means responsive to the rotational speed of said driven shaft for rendering said torque responsive means operative and inoperative.

6. A transmission comprising a drive shaft, a driven shaft, variable speed transmission mechanism connecting said shafts, means responsive to variations in the torque reactions on said driven shaft for varying the speed ratio of said transmission mechanism, and means rotatable at all times during the rotation of said driven shaft and responsive to the rotational speed thereof for acting in conjunction with said torque responsive means to increase the speed ratio of said transmission mechanism when the rotational speed of said driven shaft drops below a predetermined speed, said torque responsive means and said speed responsive means being separately connected to said transmission mechanism.

7. A transmission comprising a drive shaft, a driven shaft, means for transmitting power from said drive shaft to said driven shaft to rotate the latter at a slower speed than said drive shaft, means for connecting said shafts together for rotation at the same speed, and a pair of means simultaneously operable for rendering said last named means operable, one means of said pair being operable by torque reactions on said driven shaft and the other in accordance with rotational speed, the last mentioned means of said pair being adapted to render the first mentioned means of said pair operative and inoperative.

8. A transmission comprising a drive shaft, a driven shaft, means for transmitting power from said drive shaft to said driven shaft to rotate the latter at a slower speed than said drive shaft, means for connecting said shafts together for rotation at the same speed, and a pair of means simultaneously operable for rendering said last named means operable and separately connected to said connecting means, one of said pair of means being operable by torque reactions on said driven shaft, the other means of said pair being rotatable at all times during the rotation of the driven shaft and responsive to variations in the rotational speed thereof.

9. A transmission comprising a drive shaft, a driven shaft, planetary gearing connecting said shafts, a pair of clutch carriers, clutch elements connected to the respective carriers and engageable for connecting said shafts for rotation at the same speed, said clutch elements being disengageable for rendering said planetary gearing operative for transmitting power between said shafts to rotate said driven shaft at a slower speed than said drive shaft, and a pair of means simultaneously operable for engaging and disengaging said clutch elements, one means of said pair being operative by torque reactions on said driven shaft and the other in accordance with rotational speed.

10. A transmission comprising a drive shaft, a driven shaft, planetary gearing connecting said shafts, a pair of clutch carriers, clutch elements connected to the respective carriers and engageable for connecting said shafts for rotation at the same speed, said clutch elements being disengageable for rendering said planetary gearing operative for transmitting power between said shafts to rotate said driven shaft at a slower speed than said drive shaft, and a pair of means simultaneously operable for engaging and disengaging said clutch elements, one means of said pair being operative by torque reactions on said driven shaft, the other means of said pair being rotatable at all times during rotation of the driven shaft and responsive to variations in the rotational speed thereof.

11. A transmission mechanism comprising a drive shaft, a driven shaft, variable speed transmission mechanism connecting said shafts, means responsive to torque reactions on said driven shaft above a predetermined point for causing said transmission mechanism to transmit power to said driven shaft at a relatively high speed ratio and responsive to torque reactions on said driven shaft below said predetermined point for causing said transmission mechanism to transmit power to said driven shaft at a relatively lower speed ratio, and speed responsive means for rendering said torque responsive means inoperative for decreasing the speed ratio of said transmission mechanism unless the rotational speed of said driven shaft is above a predetermined point.

12. A transmission mechanism comprising a drive shaft, a driven shaft, variable speed transmission mechanism connecting said shaft, means responsive to torque reactions on said driven shaft above a predetermined point for causing said transmission mechanism to transmit power to said driven shaft at a relatively high speed ratio and responsive to torque reactions on said driven shaft below said predetermined point for causing said transmission mechanism to transmit power to said driven shaft at a relatively lower speed ratio, and means rotatable at all times during rotation of said driven shaft for rendering said torque responsive means inoperative for decreasing the speed ratio of said transmission mechanism unless said driven shaft is rotating above a predetermined speed.

13. A transmission comprising a drive shaft, a driven shaft, variable speed means for transmitting power between said shafts, said means including a member rotatable in one direction when the torque reaction of said driven shaft is below a predetermined maximum and fixed against substantial rotation in the other direction when the torque reaction on the driven shaft exceeds such maximum, speed responsive conditioning means for said power transmitting means, and means operating in conjunction with said rotatable member for varying the driving ratio between said shafts when the torque reaction on said driven shaft passes above or below said maximum, said speed responsive means being operative for rendering said last named means inoperative for decreasing the driving ratio between said shafts when the rotational speed of said speed responsive member is below a predetermined point.

14. A transmission comprising a drive shaft, a driven shaft, variable speed means for transmitting power between said shafts, said means including a member rotatable in one direction when the torque reaction of said driven shaft is below a predetermined maximum and fixed against substantial rotation in the other direction when the torque reaction on the driven shaft exceeds such maximum, speed responsive conditioning means for said power transmitting means connected to said driven shaft and rotatable therewith, and means operating in conjunction with said rotatable member for varying the driving ratio between said shafts when the torque reaction on said driven shaft passes above or below said maximum, said speed responsive means being operative for rendering said last named means inoperative for decreasing the driving ratio between said shafts when the rotational speed of said speed responsive member is below a predetermined point.

15. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, spring means for permitting limited rotation of said member in said last named direction, and means operative when the torque reaction on said driven shaft rotates said member in said last named direction for increasing the transmission ratio through said gearing and for decreasing the transmission ratio when said member is rotated in said first named direction, and speed responsive means operative for preventing the decreasing of the transmission ratio through said gearing.

16. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, spring means for permitting limited rotation of said member in said last named direction, and means operative when the torque reaction on said driven shaft rotates said member in said last named direction for increasing the transmission ratio through said gearing and for decreasing the transmission ratio when said member is rotated in said first named direction, and speed responsive means variable in accordance with the rotational speed of said driven shaft for preventing the decreasing of the transmission ratio through said gearing when said driven shaft is rotating below a predetermined speed.

17. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, spring means for permitting limited rotation of said member in said last named direction, means operative in accordance with the position of said rotatable member for determining the transmission ratio through said gearing, and speed responsive means for determining the operation of said last named means.

18. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, spring means for permitting limited rotation of said member in said last named direction, and means operative in accordance with the position of said rotatable member for determining the transmission ratio through said gearing, and speed responsive means rotating in accordance with the rate of rotation of said driven shaft to control said last named means to prevent the decreasing of the transmission ratio except when said speed responsive means is rotating faster than a predetermined speed and for preventing the increasing of the transmission ratio upon an increase in the torque reaction on said driven shaft when said speed responsive member is rotating faster than said predetermined speed.

19. A transmission comprising a driving shaft, a driven shaft, transmission gearing connecting said shafts, a member rotatable in one direction when the torque reaction on said driven shaft is below a predetermined maximum, said gearing being operative for creating a reaction tending to rotate said member in the opposite direction upon an increase in the torque reaction of said driven shaft above said predetermined maximum, spring means for permitting limited rotation of said member in said last named direction, a clutch engageable for decreasing the speed ratio between said shafts and releasable for increasing such speed ratio, means operable when the torque reaction on said driven shaft is below a predetermined point for tending to engage said clutch, and speed responsive means operable in accordance with the rotational speed of said driven shaft for tending to engage said clutch when the rotational speed of said driven member is above a predetermined point, said last two means cooperating for engaging said clutch when the torque reaction on said driven shaft is below the said predetermined point thereof and when the rotational speed of said driven shaft is above the said predetermined speed thereof.

20. A transmission comprising a driving shaft having a pinion thereon, a driven shaft having a pinion thereon, a pair of coaxial planetary gears meshing respectively with said pinions, a carrier for said planetary gears, means tending to lock said carrier to said driven shaft when the torque reaction on the latter is below a predetermined point, and means tending to lock said carrier to said driven shaft when the rotational speed of the latter is above a predetermined point, each of said last two means being separately inoperative for locking said carrier to said driven shaft.

21. A transmission comprising a drive shaft, a driven shaft, variable speed transmission mechanism connecting said shafts, a pair of means operative for changing the speed ratio of said transmission mechanism, one of said means being operative by torque reactions on said driven shaft and the other in accordance with rotational speed, an intermediate shaft arranged in alignment with said driven shaft, a transmission shaft arranged in alignment with said intermediate shaft, a free driving pinion on said intermediate shaft, a fixed pinion on said intermediate shaft, a crown wheel gear on said transmission shaft, a pair of gears fixed to each other and rotatable about the axis of said intermediate shaft and about an axis transverse thereto, one gear of said pair meshing with said free and fixed pinions and the other meshing with said crown wheel gear, means for connecting either or both of said free pinion and said intermediate shaft to said driven shaft to be rotated therewith, means for preventing rotation of said pair of gears in one direction about the axis of said intermediate shaft under all conditions, and means for preventing rotation of said pair of gears in the other direction about the axis of said intermediate shaft when said intermediate shaft is disconnected from said driven shaft.

22. A transmission comprising driving and driven shafts, transmission means connecting said shafts, a torque member responsive to torque reactions between said shafts, said member being rotatable in one direction when the torque reaction of said driven shaft is below a predetermined point, and in the opposite direction upon an increase in such torque reaction, yielding means for resisting turning movement of said torque responsive member in said last named direction, means operative for determining the transmission ratio through said transmission means in accordance with the position of said torque responsive member, and speed responsive means for determining the operation of said last named means.

23. A transmission comprising driving and driven shafts, transmission means connecting said shafts, and cooperating torque and speed responsive means for determining the driving ratio through said transmission means and operative when the torque reaction on said driven shaft is below a predetermined point for decreasing the driving ratio, said torque responsive means having a portion operative after the driving ratio has been reduced, for preventing said torque responsive means from governing the driving ratio except upon operation of said speed responsive means.

24. In a power transmitting apparatus, driving and driven members, clutch means between said members, spring means having a predetermined maximum tension urging the elements of said clutch means toward operative engaging position, centrifugal means operative upon progressively increasing speeds for progressively increasing the operative pressure between the elements of the clutch, and variable speed transmission means controlled by said clutch means.

25. A transmission comprising a drive shaft, a driven shaft, transmission mechanism connecting said shafts and including a clutch, and a pair of means for controlling said clutch, said pair of means being respectively speed and torque responsive and being separately inoperative and mutually dependent for effecting engagement of said clutch.

26. A transmission comprising a drive shaft, a driven shaft, transmission mechanism connecting said shafts and including a clutch, and a pair of means for controlling said clutch, said pair of means including a pressure member operative against one side of said clutch and responsive to torque reactions, and a speed responsive pressure member operative against the other side of said clutch, engagement of said clutch being dependent upon simultaneous operation of said pair of means.

27. A transmission comprising a drive shaft, a driven shaft, transmission mechanism connecting said shafts, a clutch controlling said transmission mechanism, and a pair of means simultaneously operable for controlling said clutch from opposite sides thereof for changing the speed ratio of said transmission mechanism, one of said means being torque responsive and the other being responsive to variations in the rotational speed of said driven shaft.

28. A transmission comprising a drive shaft, a driven shaft, planetary gear mechanism connecting said shafts, a clutch controlling said mechanism, and a pair of means simultaneously operable for controlling said clutch from opposite sides thereof for changing the speed ratio of said planetary gear mechanism, one of said means being torque responsive and the other being responsive to variations in the rotational speed of said driven shaft.

29. A transmission comprising a drive shaft, a driven shaft, transmission mechanism connecting said shafts, a clutch controlling said mechanism, a pair of means controlling said clutch for changing the speed ratio of said transmission mechanism, one of said means being operable by torque reaction and arranged to control the clutch from one side, and the other by rotational speed and arranged to control the clutch from the opposite side.

30. A transmission comprising a drive shaft, a driven shaft, variable speed means for transmitting power between said shafts, said means including a member rotatable in one direction when the torque reaction of said driven shaft is below a predetermined maximum and fixed against substantial rotation in the other direction when the torque reaction on the driven shaft exceeds such maximum, spring means resisting turning movement of said member in said other direction, speed responsive conditioning means for said power transmitting means, and means operating in conjunction with said rotatable member for varying the driving ratio between said shafts when the torque reaction on said driven shaft passes above or below said maximum, said speed responsive means being operative for rendering said last named means inoperative for decreasing the driving ratio between said shafts when the rotational speed of said speed responsive member is below a predetermined point.

31. A transmission comprising a drive shaft, a driven shaft, variable speed means for transmitting power between said shafts, said means including a member rotatable in one direction when the torque reaction of said driven shaft is below a predetermined maximum and fixed against substantial rotation in the other direction when the torque reaction on the driven shaft exceeds such maximum, spring means resisting turning movement of said member in said other direction, speed responsive conditioning means for said power transmitting means connected to said driven shaft and rotatable therewith, and means operating in conjunction with said rotatable member for varying the driving ratio between said shafts when the torque reaction on said driven shaft passes above or below said maximum, said speed responsive means being operative for rendering said last named means inoperative for decreasing the driving ratio between said shafts when the rotational speed of said speed responsive member is below a predetermined point.

32. In a power transmitting apparatus, driving and driven members, clutch means between said members, spring means having a predetermined maximum tension urging the elements of said clutch means toward operative engaging position, means constructed and arranged to be operated by torque reactions between said members to operate against said spring means to tend to release said clutch means, centrifugal means operative upon progressively increasing speeds and connected for applying a force independently of said torque operated means for progressively increasing the operative pressure between the elements of the clutch, and variable speed transmission means controlled by said clutch means.

33. A transmission comprising a drive shaft, a driven shaft, transmission mechanism for transmitting power between said shafts and including a clutch, and a pair of means for controlling said clutch, each means of said pair being constructed and arranged to tend to effect engagement of said clutch, and each, in itself, being ineffective for causing clutch engagement, said pair of means being constructed and arranged to provide simultaneously effective means operable for causing engagement of said clutch.

34. A transmission comprising a drive shaft, a driven shaft, means for transmitting power from said drive shaft to said driven shaft to rotate the latter at a slower speed than said drive shaft, means for connecting said shafts together for rotation at the same speed, and a pair of means simultaneously operable for controlling said shaft connecting means, one means of said pair being operable by torque reactions on said driven shaft and the other by rotational speed of said driven shaft, each means of said pair being connected to transmit a force to said shaft connecting means independently of the other means of said pair, each such force being separately ineffective for controlling said shaft connecting means.

FRANK C. REYNOLDS.